United States Patent [19]

Buckley

[11] Patent Number: 5,487,853
[45] Date of Patent: Jan. 30, 1996

[54] ENERGETIC STITCHING FOR COMPLEX PREFORMS

[75] Inventor: Daniel T. Buckley, Shrewsbury, Vt.

[73] Assignee: The C. A. Lawton Company, DePere, Wis.

[21] Appl. No.: 195,175

[22] Filed: Feb. 14, 1994

Related U.S. Application Data

[60] Continuation-in-part of Ser. No. 22,084, Feb. 25, 1993, Pat. No. 5,364,258, which is a division of Ser. No. 552,253, Jul. 12, 1990, Pat. No. 5,217,656.

[51] Int. Cl.$^6$ ............................ B29C 35/08; B29C 70/84
[52] U.S. Cl. .................... 264/496; 156/272.200; 156/275.100; 156/290; 156/308.400; 156/379.600; 264/241; 264/261; 264/263; 425/174.400; 425/500; 425/501
[58] Field of Search ............................ 264/22, 241, 261, 264/263; 156/272.2, 275.1, 275.5, 290, 291, 307.3, 308.4, 379.6; 425/174.4, 500, 501

[56] References Cited

U.S. PATENT DOCUMENTS

| | | | |
|---|---|---|---|
| 3,627,609 | 12/1971 | Bragole | 156/273.3 |
| 3,740,287 | 6/1973 | Eichhorn | 156/272.2 |
| 3,878,019 | 4/1975 | Chapman et al. | 156/272 |
| 3,982,185 | 9/1976 | Shinn et al. | 156/272.2 |
| 4,156,626 | 5/1979 | Souder | 156/273.3 |
| 4,312,692 | 1/1982 | Ikeda et al. | 156/272.2 |
| 4,509,107 | 4/1985 | Malinowski | 156/275.5 |
| 4,698,113 | 10/1987 | Ogawa | 156/272.2 |
| 4,916,805 | 4/1990 | Ellrich et al. | 156/272.2 |
| 5,009,731 | 4/1991 | Yoshikawa et al. | 156/275.5 |
| 5,064,494 | 11/1991 | Duck et al. | 156/275.5 |
| 5,169,571 | 12/1992 | Buckley | 264/136 |
| 5,173,142 | 12/1992 | Billiu | 156/272.2 |
| 5,192,387 | 3/1993 | Buckley | 156/275.5 |
| 5,217,654 | 6/1993 | Buckley | 264/135 |
| 5,217,656 | 6/1993 | Buckley et al. | 264/134 |
| 5,338,169 | 8/1994 | Buckley | 425/174.8 R |

Primary Examiner—Jay H. Woo
Assistant Examiner—Duane S. Smith
Attorney, Agent, or Firm—Hill, Steadman & Simpson

[57] ABSTRACT

A three-dimensional complex preform is made formed of various types of reinforcement fiberglass fibers with a binder at the interstices which rigidize the preform to the shape and form approximating the molded article, which can be handled and stored until a final mold is made filling the interstices with plastic and curing the plastic. Complex preforms require either specific reinforcements in the form of increased sections, specific reinforcement, or require modification or enlargement in size or increase in complexity by the attachment of one or more additional preforms. To modify an existing preform and obtain a desired shape and form, reinforcement members or additional preforms are attached by energetic stitching. Energetic stitching includes the application of an electromagnetic energy curable binder and the application of electromagnetic radiation to cure the binder. The stitching normally occurs over a restricted area defined by the contact surfaces to join two or more members and the restricted area is obtained in various forms such as by applying binders in preselect areas, or by applying the curing radiation in preselect areas or by masking the application of the binder or masking the application of the energy by controlling of the location and/or areas where the stitching is applied. Substantial modifications and flexibility in the type of resultant preform can be attained whether the preform has an add on reinforcement member or is formed by the attachment of one or more additional preforms to it to obtain a complex resultant preform.

19 Claims, 5 Drawing Sheets

ENERGETIC STITCHING FOR COMPLEX PREFORMS

CROSS REFERENCE TO RELATED APPLICATION

The present application is a continuation-in-part of my application Ser. No. 08/022,084, filed Feb. 25, 1993, now U.S. Pat. No. 5,364,258 which is a divisional application of patent application, Ser. No. 07/552,253, filed Jul. 12, 1990, now issued Jun. 8, 1993 as U.S. Pat. No. 5,217,656.

BACKGROUND OF THE INVENTION

1. Field of the Invention

The present invention relates to a method and to an apparatus for making structural reinforcement preforms which are subsequently used for molding processes such as liquid composite molding (LCM) as resin transfer molding or other processes requiring preforms for structural composites. It is further particularly concerned with the structural modification of preforms by attachment of specific reinforcement members, by being joined to other preforms, or where the preforms are modified in shape, all by a process of energetic stitching.

2. Description of the Prior Art

In the manufacture of preforms as done by the prior art, the processes have been time-consuming and relatively expensive. In making preforms according to one process known as a directed fiber process, it has heretofore been the practice to spray chopped fibers with a binder resin onto a form that has air pulled therethrough to locate and hold the fibers in place. The form with the fibers and the binder resin thereon is then moved into a hot air plenum chamber, is dried and/or cured with heat to set the binder resin. In addition, a great deal of processing space is required for drying, curing and cooling the preforms.

In making preforms by another process known as the thermoforming process, it has heretofore been the practice to use a material such as a continuous strand fiber mat that has been previously coated by the fiber manufacturer with a thermoplastic binder. The thermoformable material is supplied typically in a roll form whereby it is unrolled into flat sheets of varied layer thicknesses and clamped into a holding frame at the edges. The frame network is then positioned in an oven chamber containing radiant heaters which slowly heat the reinforcement mat and the thermoplastic binder from both sides. Upon heating, the thermoplastic binder softens and, while soft, the frame network is quickly transferred into a cold mold. The mold closes via a press forcing the reinforcement mat into the desired shape of a preform. Upon cooling, the thermoplastic binder stiffens and thus holds the thermoformable mat in its new shape. There are other machinery arrangements to accomplish thermoforming but the steps are the same.

As pointed out in an earlier copending patent application, Ser. No. 07/446,859, filed Dec. 6, 1989, these processes are slow, require a great deal of space and a large amount of energy. As also pointed out, in conventional LCM process applications for structural components, fiber layer thickness across the entire preform is increased to meet the strength requirements of one area, which results in unnecessary use of material in other areas and increases thickness and weight. Furthermore, neither the directed fiber process nor the thermoformable mat process allows a designer to add ribs or closed sections to maximize design properties.

In the aforementioned application, therefore, there has been proposed a new system which eliminates the necessity for large rooms and constantly operating ovens, cooled presses and the like and permits design flexibility with respect to the provision of reinforcement ribs, closed sections, placement of specific reinforcements and/or attachment members and complex shapes while at the same time saving on energy and materials.

The new process utilizes specifically-developed binders along with directed energy systems for rigidizing the composite forms and attaching structural components to the preforms and is entirely compatible with RTM and SRIM resin systems, i.e. polyesters, vinyl esters, urethanes, epoxies and phenolics. The process is designed to be capable of full automation and to enable specific distribution and placement of numerous type of reinforcements, where necessary, for the required structural properties of a preform. There is a complete freedom of design inherent in the process and allows for the most desirable reinforcement type and/or structures including closed structural shapes and varied wall sections to meet design criteria.

In the new process, mats of reinforcement material are cut into a desired shape as a two-dimensional planar development of a desired preform. The cut mats are then coated with a binder which is responsive to electromagnetic energy, either microwave radiation or ultraviolet radiation, and the cut mats are placed in a three-dimensional mold and pressed to replicate the desired shape of the preform.

While in the mold, the coated and shaped mats are subjected to the appropriate electromagnetic radiation, either microwave or ultraviolet radiation, to cure the binder resin and provide rigidity in a matter of seconds, rather than minutes as with the heat-curable processes. At this point, the preform is an intermediate product ready for use in a further molding operation (LCM) or it may be used as a carrier preform for the attachment of additional structural reinforcement members and the like before being used in a further molding operation (LCM).

As a carrier preform, this preform can be modified by an energetic stitching process. Such modification may involve the attachment of a specific reinforcement member, the attachment of another preform or a modification of the preform shape. For example, where the preform has a very complex shape, several subassembly preforms can be separately made and joined to each other by energetic stitching to have the final form of the complex preform. As an example of one manner of using the energetic stitching process where a reinforcement member or rib is to be added, the rigid three-dimensional preform is moved to a station where a designated area or areas of the preform or of a subassembly have been masked and therefore uncured or are provided with a further coating of an electromagnetic energy curable binder resin, the subassembly (e.g. reinforcement member or the like) is moved into intimate contact with the preform at the coated area or areas and the appropriate electromagnetic radiation is applied to energetically stitch (cure the binder) the subassembly to the carrier preform. This can also take place in situ when the final attachment has been made by such energetic stitching, the preform is ready for use as a structural reinforcement preform as a part of a further molding process for making a structural composite.

In structural composites, it is often necessary to have closed sections to maximize the properties required of the molded part at minimum weight. This requires the use of lightweight core materials to be included in the preform since a hollow preform will fill up with resin or collapse during the molding process. Therefore, in the modification of the preform, a core may be inserted in any such pocket or chamber to prevent or at least minimize such an event. The core may be held in place by a subassembly or sequential assembly of the preform and energetically stitched to surround the core. This eliminates the use of staples, mechanical stitching or tapes to fasten to the core. The core material can be any lightweight material used in the conventional art such as balsa wood, urethane foam, phenolic foam, PE foam or can be of a pressurized bladder that is removable and left in or blow molded hollow core pressurized sufficiently to withstand the liquid resin pressure during the molding phase.

SUMMARY OF THE INVENTION

It is therefore the object of the present invention to provide an improved method and apparatus for making complete rigid three-dimensional preforms in which the material handling and manipulation are different from and simplified with respect to those heretofore known.

A further object of the invention is to provide an improved method and apparatus for making complete preforms utilizing the process of energetic stitching to modify an initial or subassembly preform and to utilize a rapid simplified step of energetic stitching whereby the completed preform is finished in less time and in a more acceptable condition than by the use of processes and equipment heretofore available.

Another object of the invention is to provide for the energetic stitching of reinforcement members to the inside and/or outside of the "hollow" three-dimensional preforms and including the provision of an enclosure for such a hollow preform, these elements being attached by energetic stitching.

After forming, the rigidized three-dimensional initial subassembly preform is used as a carrier preform for the attachment of reinforcement members or other subassembly preforms. In this part of the process, the carrier preform is oriented to a desired position, a surface area or areas thereof either have been masked and left uncured in the forming phase or are sprayed with a binder resin, such as an ultraviolet curable binder resin. A reinforcement rib or the like is moved into intimate contact with said area having uncured binder and the area is then illuminated with electromagnetic energy, here ultraviolet energy, to cure the binder resin. The cured binder resin bonds the reinforcement member to the carrier preform. This attaching of reinforcement members, termed energetic stitching, may take place any number of times to provide specific reinforcement structures such as ribs inside the three-dimensional shape, or outside the three dimensional shape on the outer surface thereof and/or to enclose a core material to provide the hollow three-dimensional structure. Various other procedures may be used for the energetic stitching method to obtain the final preform assembly as will be described. After the final reinforcement member or other member is attached, the final preform may be stored or moved to a molding station of an LCM molding process.

Other objects, features and advantages of the invention, its organization, construction and operation will be best understood from the following detailed description, taken in conjunction with the accompanying drawings, on which:

DESCRIPTION OF THE PREFERRED EMBODIMENTS

Figure 1:
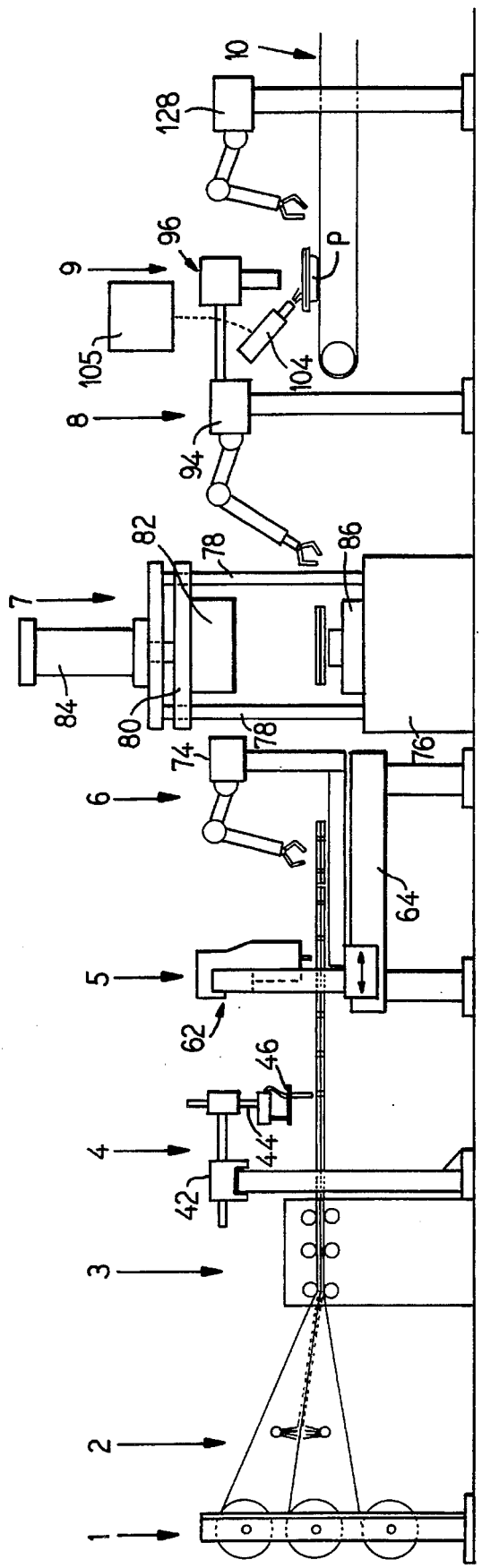
FIG. 1 is a schematic elevational showing of a mechanism for making preforms and for accomplishing the energetic stitching for modifying or reinforcing the preforms.

Referring to FIG. 1, a process for making rigid three-dimensional preforms is illustrated as comprising a plurality of process stations or stages 1–10.

At the supply stage 1, a plurality of rolls of reinforcement material, such as glass fiber continuous strand, chopped strand, woven fabric mat or the like is mounted for dispensing a like plurality of webs of the material superposed with respect to one another toward a compaction stage 3 where the webs are received, guided and directed coplanar with respect to one another.

Between the supply stage 1 and the compaction stage 3 is a binder application stage 2 in which an electromagnetic radiation-curable binder resin is applied to at least one surface of each pair of facing surfaces of the webs. Here, the binder may be applied to the upper and lower surfaces of the middle web, but may also be applied to the lower surface of the upper web and the upper surface of the lower web or to all of the facing surfaces.

In the pressing or compaction stage 3, the webs are pressed together causing spreading of the binder and permeation of the binder into greater contact areas with the fibers of the webs.

The superposed webs are then fed to an energetic basting station 4 where they are basted or tack welded together at locations spaced longitudinally and transversely of the webs. These spaced locations, as will hereinafter be described, are also considered to be basting zones in that they are three-dimensional and extend to and bind all of the webs.

The webs may or may not be basted together to form essentially a single element, are then moved to a net shape pattern cutting stage 5 in which a two-dimensional planar projection or planar development of the three-dimensional desired structure is cut from the web for later forming into the three-dimensional shape of the preform. The shape cut from the multilayer web is hereinafter called a mat and is transferred to a mold stage 7 by way of a material pickup stage 6. At the mold stage 7, the mat is positioned between separable parts of a mold which is then closed causing the mat to assume the contours, i.e. shape, of the three-dimensional preform. At the mold stage 7 and while still in the mold, the shaped mat is subjected to electromagnetic radiation of a type to which the binder resin is sensitive to cure. Upon curing, the shaped mat becomes rigid and is transformed into a rigid three-dimensional preform. Upon opening of the mold, the preform may be removed from the mold stage 7 and transferred to an energetic stitching stage 9 by way of a material handling stage 8, that is if the preform is to be considered a carrier preform for the attachment of reinforcement members or the like. If not, the material handling stage 8 may simply deposit the rigid three-dimensional preform on a conveyor 10 for discharge for storage or for transport to, for example, a liquid composite molding process.

If the preform is to assume the status of a carrier preform, the material handling stage 8 may operate in conjunction with the electromagnetic stitching stage 9 to manipulate the preform into positions as hereinafter described.

In the electromagnetic stitching stage 9, reinforcement members are attached to the carrier preform by spraying an electromagnetic-sensitive binder, as indicated at 104 onto specified locations of the carrier preform and/or the subassembly, the reinforcement rib moved into a desired orientation and into intimate contact with the locations by a material handling device 128 and the locations subjected to electromagnetic radiation by way of an electromagnetic stitching source 96. This may also be accomplished by leaving some binder uncured by masking out UV light when the carrier preform is being manufactured. This eliminates the second spray of binder when appropriate as determined by the design.

There may be a plurality of the material handling devices 128, as needed, in order to handle and stitch a plurality of reinforcement members to the carrier preform.

As indicated on FIG. 1, the material handling stages may comprise a plurality of robots 74, 94, 128 and 105, of which the robot 105 for moving the spray device 104 is symbolically illustrated as connected thereto by mechanical linkage shown by broken lines. Inasmuch as robotics and robotic devices are well known in the art, a detailed explanation thereof is not considered necessary here.

It will be appreciated that the above-described process is continuous and describes a stepped process cycle in which the processing stage with the longest processing time is the controlling stage. Inasmuch as shaping and rigidizing the preform is only a matter of seconds, it is assumed that for most processes, this is not the controlling stage. Depending on the number of reinforcement members added and the nature of the shape of the cut pattern, either of these stages could be considered the controlling stage by which all other processing times and the timing thereof are determined and tailored to the following molding process.

Figure 2:
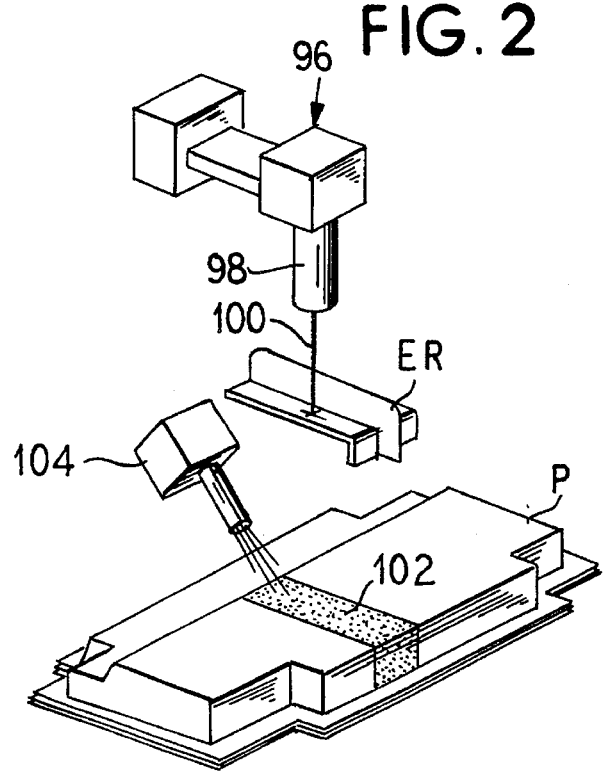
FIG. 2 is a perspective schematic showing of performing energetic stitching by adding a reinforcement member to the preform.

Assuming that the preform P is now considered to have the status of a carrier preform, the preform P is moved to the energetic stitching stage 9 (FIG. 1). At this station, the robot 94 of the material handling stage 8 may hold the preform P in the position illustrated in FIG. 2. While in this position, the robot 105 manipulates a binder applicator 104 to spray an electromagnetic energy-curable binder, when necessary, on an area 102 at a location at which an external reinforcement rib ER is to be attached and/or on the matching surface of the reinforcement rib. Then, the robot 128 (FIG. 1) or another suitable manipulator orients the member ER into position transversely of the preform P and into intimate contact with the sprayed area 102. Then, a robot 96 positions an electromagnetic stitcher into place which in FIG. 2 is constituted by an ultraviolet generator 98 for producing an ultraviolet beam 100, and to direct the same onto an area or a plurality of such areas along the rib ER, to cure the binder thereat and energetically stitch the rib ER to the preform P.

Figure 3:
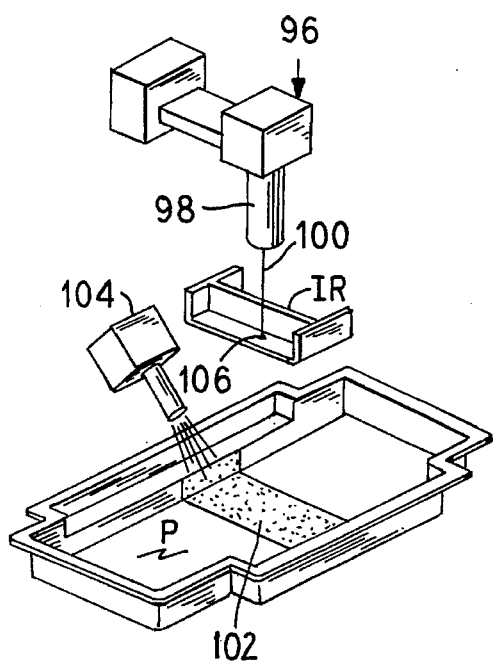
FIG. 3 is a schematic perspective view illustrating adding a reinforcement member to an internal cavity of a preform.

The robot 94 may then rotate the preform P 180° and the same steps then performed for an internal reinforcement rib IR to energetically stitch the same with the cavity of the carrier preform P. As shown in FIG. 3, this is an almost identical operation to that shown in FIG. 3 for the external rib ER. The robot gantry 96 may be moved, in either case, to scan along the length of the rib and energetically stitch the respective rib to the carrier preform at a plurality of locations 106.

Figure 4:
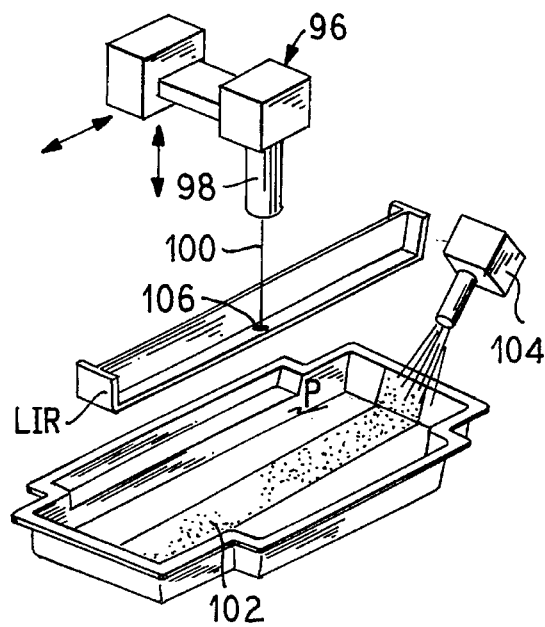
FIG. 4 is a schematic perspective view illustrating attaching a reinforcement member to an internal surface of a preform.

Alternatively or in addition to the internal rib IR being applied, the robot may manipulate the binder spray device 104 to spray an elongate area along the inner surface of the carrier preform P and/or a matching surface of the internal rib IR, FIG. 4. In this case, the robot 96 or similar manipulator picks up and moves an appropriate shaped elongate internal reinforcement member LIR into intimate contact with the preform P at the sprayed area and the ultraviolet beam 100 scans that area or a plurality of locations 106 thereof for stitching the member LIR to the interior of the carrier preform P.

Figure 5:
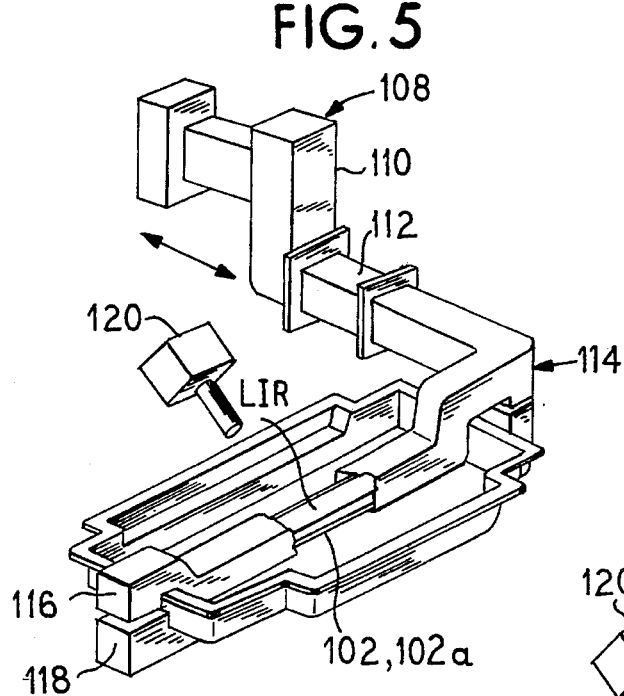
FIG. 5 is another schematic perspective view illustrating attaching a reinforcement member to an internal surface of a preform.

As an alternative embodiment, reference taken to FIG. 5 which illustrates the same basic structure as FIG. 4, with the exception of the application of the electromagnetic energy. In FIG. 5, a robot manipulates a binder spray device 120 which sprays a microwave-sensitive binder along the area 102 and/or a matching area 102 under the rib LIR, a robot positions the rib LIR into intimate contact with the preform P at the sprayed area 102 and microwave energy is supplied from a robot manipulated device 108 carrying a microwave generator 110 which is coupled at 112 to a split waveguide 114 including an upper waveguide section 116 and a lower waveguide section 118. As shown, the waveguide sections 116 and 118 together form a single waveguide shaped to conform to the shape of the carrier preform P with the reinforcement rib LIR in place and some mechanism robot or the like (not shown) must be provided to open and close the waveguide 114.

Figure 6:
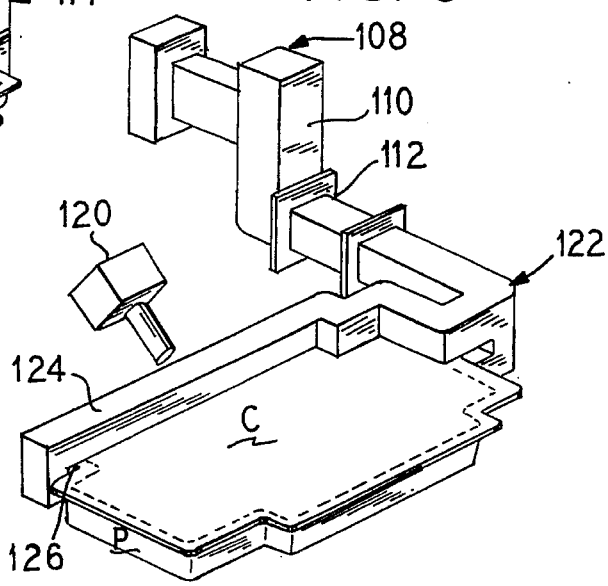
FIG. 6 is a perspective schematic showing illustrating the attachment of a cover plate to a preform by energetic stitching.

Sometimes it is desirable to close the hollow structure of the preform or of the carrier preform P including any core material therein to block filling with resin during the following molding process. In this case, and as shown in FIGS. 1 and 6, the robot 108 or similar manipulator picks up a cover C and positions the same in registry with the preform P. The robot and possibly additional robots may then grasp and position a portion of the edges of the assembly, after spraying the marginal edge or flange of the preform P and/or of the cover C with a microwave-sensitive binder resin, into a slotted waveguide 122 having an upper section 124 and a lower section 126. The carrier preform has now been energetically stitched closed and may include core material and/or one or more internal reinforcement ribs of the type illustrated in FIGS. 3 and 4. In addition, it may include or be manipulated and stitched to include one or more external ribs ER of the type illustrated in FIG. 2.

Figure 7:
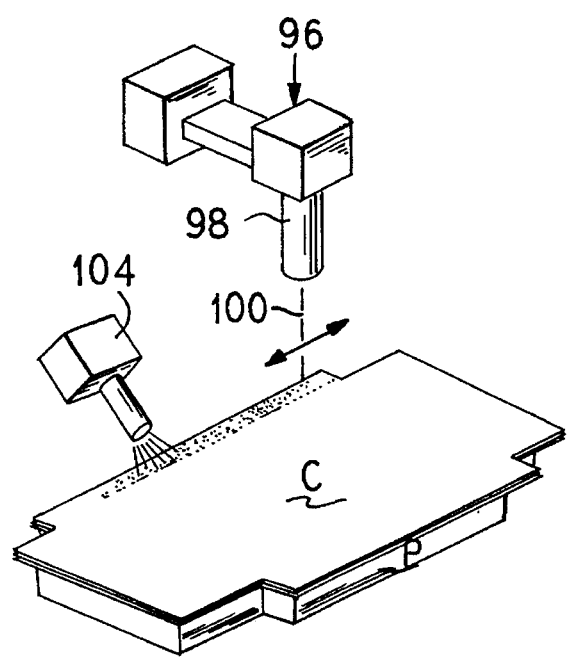
FIG. 7 is a schematic perspective view illustrating the attachment of a cover to a preform by energetic stitching.

FIG. 7 illustrates a similar cover stitching procedure in which the binder spray 104 is manipulated to spray ultraviolet-sensitive binder resin along the marginal edge or flange of the preform P and/or a cover C and the cover C is manipulated into proper position and the two elements are stitched together with an energetic stitching head 98 which is positional by way of the gantry 96 to stitch around the entire periphery of the assembly.

As mentioned above, the energetic stitching procedures may be performed by various types of radiating elements, including microwave, ultraviolet and electron gun.

Figure 8:
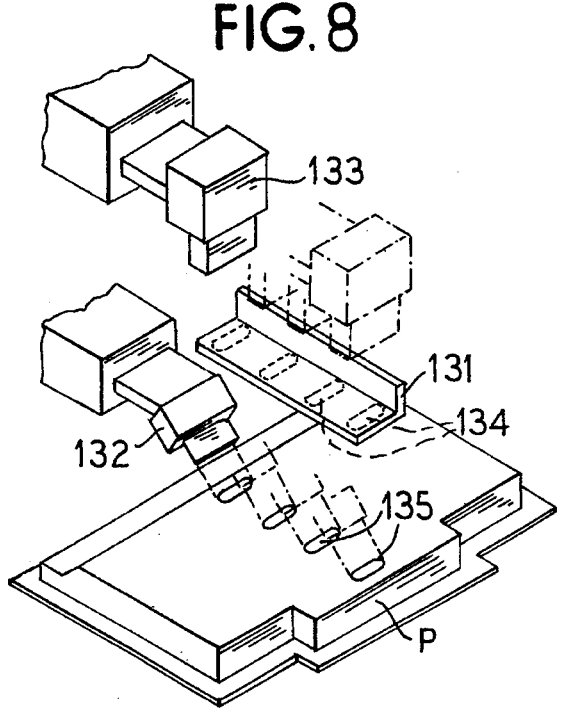
FIG. 8 is a schematic perspective view illustrating one manner of attaching a reinforcement to a preform by energetic stitching.

As illustrated in FIG. 8, a previously formed preform P is arranged to have a reinforcement member 131 attached thereto. The reinforcement member may be another preform or a finished reinforcement member. Similarly, it will be understood that when reference is made to the preform P, this may be a completed mold and the attachment process and attachment mechanism may be utilized to attach a completed reinforcement member. However, the processes and apparatuses for utilizing the principles of energetic stitching, as will be described in connection with FIGS. 8 through 13 will primarily refer to the attachment of a reinforcement member to a preform. The reinforcement member may be a completed unit used solely for reinforcement or may be another premade preform. In either arrangement after the preform has had a member attached to it by the energetic stitching process, the preform will be handled and/or stored and subsequently completed into a molded article by having the interstices filled with plastic and the article cured in previously known processes. By the attachment of reinforcement members or the attachment of another preform, the initial preform will take the shape of its mold and by the energetic stitching process, a newly shaped preform will be presented having the shape of the original preform with an attached reinforcement member or attached to another preform. The process and apparatus is particularly advantageous in attaching a reinforcement member of another character which could not be made in the initial preform forming process and is further particularly advantageous where a complex shaped preform is to be made and two individual independent preforms are first formed and then attached to each other by the energetic stitching process. The flexibility and adaptability of the arrangement will become more apparent particularly in that it allows the attachment of specific reinforcement materials to preforms at any location including internal locations and preforms may be built up of a combination of other preforms with reinforcement members to obtain preforms of complex shapes which could not otherwise have been made except with very complex time-consuming methods which would make them commercially undesirable.

Another important use of energetic stitching to obtain a unique shaped preform is by laying additional material into a preform to make it thicker or to provide a boss in a specific location.

With reference to FIG. 8, a preform P will have a reinforcement member 131 attached. A binder applicator 132 places limited areas 135 of binder onto the surface of the preform P. The reinforcement member 131 is then positioned onto the preform and electromagnetic energy is applied by a head 133 generating electromagnetic radiation and directing such radiation over limited areas 134 which correspond to the areas 135 where the binder has been applied. In this manner, the reinforcement member 131 is energetically stitched to the preform P. While reference is made to utilizing an electromagnetic energy curable binder and electromagnetic energy generating a head 133, in a preferred form the binder is an ultraviolet energy curable binder and the head 133 generates ultraviolet radiation. The description of the manner in obtaining energetic stitching with FIGS. 9 through 13 will make reference primarily to ultraviolet responsive binder and ultraviolet energy being applied. It will be understood, however, in the generic form, the binder may be an electromagnetic energy responsive binder and the applicator will apply electromagnetic energy, and in the preferred form ultraviolet responsive binder will be used and ultraviolet energy applied to complete the energetic stitching process.

Figure 9:
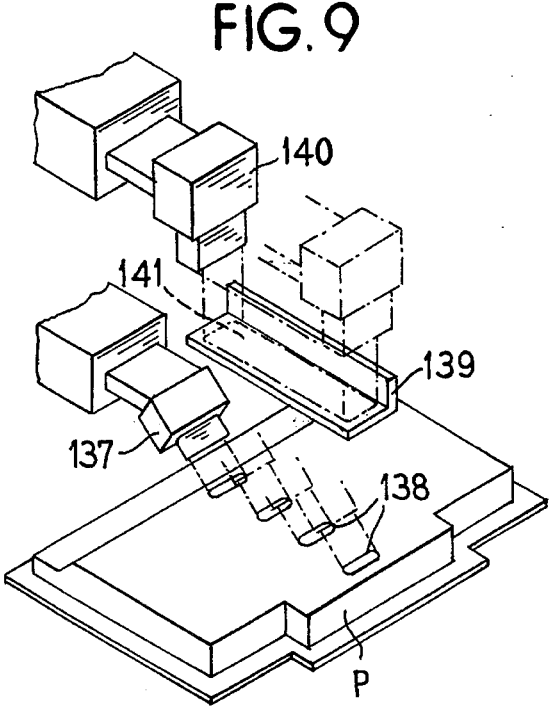
FIG. 9 is a schematic perspective view illustrating another manner of attaching a reinforcement member to a preform by energetic stitching.

In the arrangement of FIG. 9, a reinforcement member 139 is to be attached to a preform P. A binder applicator 137 applies binder at limited areas 138 such as by spraying or other applicator means which applies the ultraviolet responsive binder to the surface of the preform. The reinforcement member 139 is then placed in position over the areas 138. An ultraviolet energy radiation head 140 applies ultraviolet radiation energy over a broad area 141 to the reinforcement member thus activating the binder at the locations 138. While the ultraviolet energy is applied over a broad area, only the areas which contain binder will be activated and energetic stitching will have occurred joining the reinforcement member 131 to the preform P.

Figure 10:
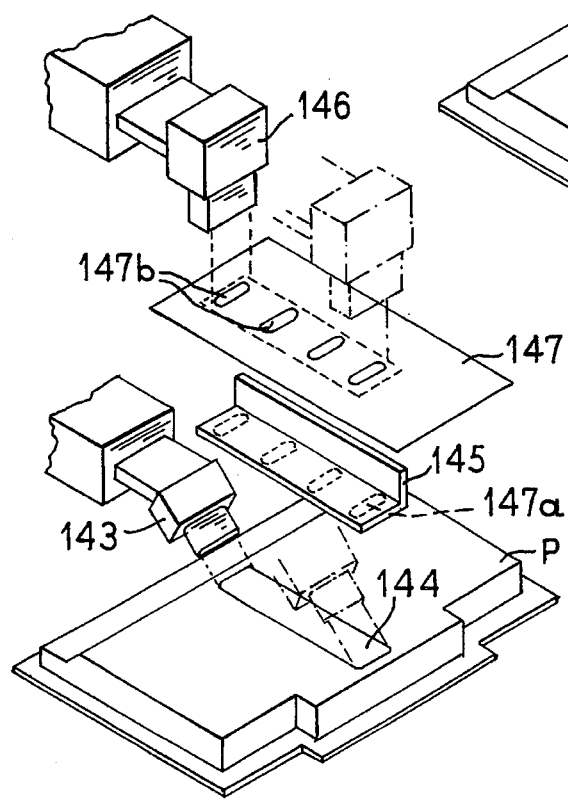
FIG. 10 is a schematic perspective view illustrating still another form of attachment of a reinforcement member to a preform by energetic stitching.

In FIG. 10, a head 143 applies ultraviolet energy responsive binder to a broad area 144 corresponding generally to a location where a reinforcement member 145 will be positioned and attached. A head 146 generating ultraviolet energy will direct the energy onto the reinforcement member after it has been placed on the surface of the preform P. However, a mask 147 will be positioned between the ultraviolet head 146 and the reinforcement member 145. This mask will block the transmission of ultraviolet energy except at cutout locations 147b so that only areas 147a will be exposed to the ultraviolet energy. This means that only areas which correspond to the areas 147a will be activated in the binder 144. The binder can be broadly applied without concern as to the careful limitation of areas and the control of the stitching is obtained by the openings in the mask 147. These openings can be selectively located such as where the reinforcement member is complex and stronger attachment needs to be attained in some areas than others. The concept provides an opportunity to energetically stitch material by adding more binder.

Figure 11:
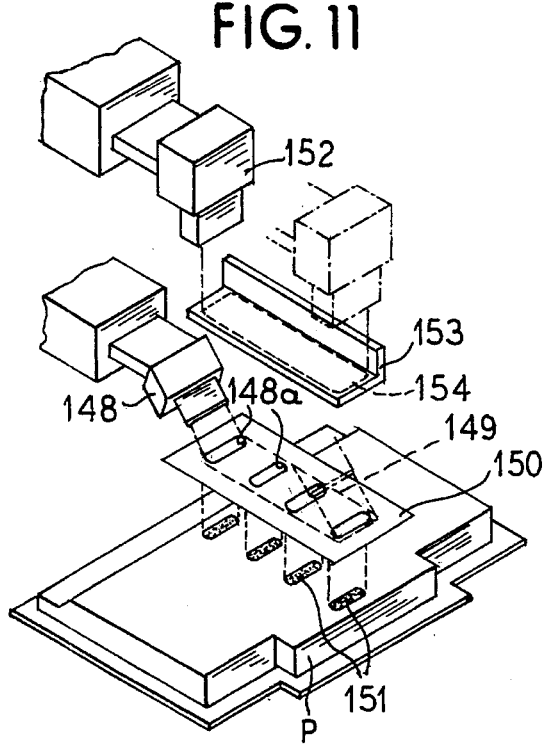
FIG. 11 is a schematic perspective view illustrating another manner of attaching a reinforcement member to a preform by energetic stitching.

In the arrangement of FIG. 11, an ultraviolet sensitive binder is applied by a head 148 which applies, such as by spraying, binder over a broad area as indicated by the dotted lines 149. A mask 150 is positioned over the upper surface of the preform P having shaped openings 148a which allow binder to be applied only in the areas 151 which correspond with the openings 148a. After the binder is applied, a reinforcement member 153 is laid onto the upper surface of the preform and ultraviolet energy is applied over a broad area as indicated by the dotted lines 154 in the reinforcement member 153. The ultraviolet energy is applied by an ultraviolet generating head 152 which transmits ultraviolet energy over a broad area but energetic stitching to attach the reinforcement member 153 to the preform P occurs only at the limited areas 151 of the binder.

Figure 12:
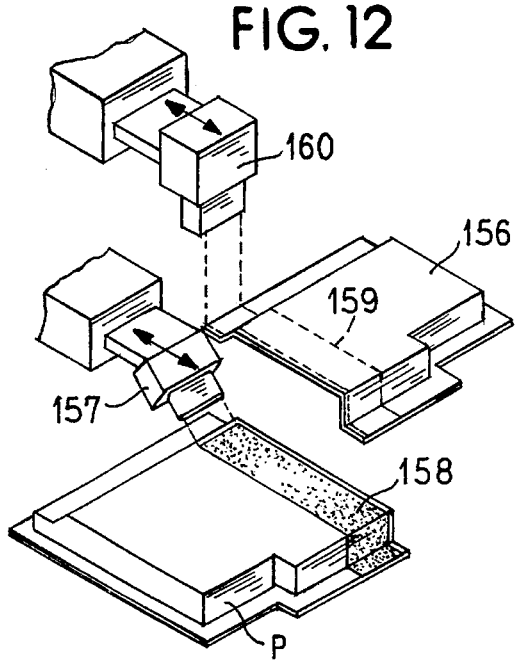
FIG. 12 is a schematic perspective view illustrating the attachment of another preform shape to an existing preform such as used in obtaining complex preforms, using energetic stitching.

The arrangement of FIG. 12 illustrates joining a complex reinforcement member 156 or a premade preform 156 to another preform P. Attachment will occur at an area 158 where a binder is applied by a binder head 157 applying ultraviolet activatable binder. After the binder is applied, the member 156 is laid in place over the preform, and an ultraviolet generating head 160 applies ultraviolet energy over the area 159 to energetically stitch and attach the two members 156 and P. This allows making a complex preform of a nature which would be difficult to form in an initial preform mold.

Figure 13:
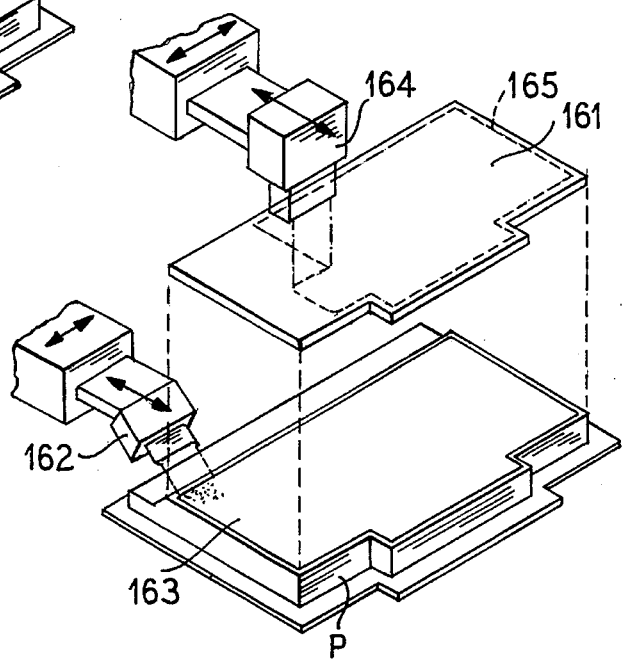
FIG. 13 is a schematic perspective view illustrating the attachment of two preforms to each other utilizing energetic stitching.

In the arrangement of FIG. 13, there is illustrated an arrangement where a preform can be built up inside. An originally prepared preform has another enlarging preform 161 to be attached thereto. Ultraviolet responsive binder is applied over a broad area 163 by a binder applicator head 162. The enlarging preform 161 is then put in place over the upper surface of the preform P and ultraviolet energy is applied over the dotted line area 165 by an ultraviolet generating head 164. This arrangement allows for building up preforms and energetically stitching the preform parts together to result in a completed preform. The completed preform will then be handled or stored and eventually subjected to the molding process by having the interstices filled with plastic and the plastic cured.

Thus, it will be seen various arrangements of energetic stitching have been utilized. The arrangements of FIGS. 8 through 13 have been utilized. The arrangements of FIGS. 8 through 13 each have certain advantages in the utilization of the energetic stitching process and the type of arrangement selected will depend on the shape of the preform, its size, the reinforcement needed, the complexity of the final preform and other factors which will be apparent when the actual preform needed is presented to the manufacturer.

It will be understood that the arrangements of FIGS. 8 through 13 may be combined in certain instances where three or more parts are to be joined and that the features can be utilized both for the attachment of members to existing preforms internally and externally. In certain instances, preforms present complicated shapes and internal build-ups can be applied making it possible to attain a preform shape which would be essentially impossible if a single preform or a preform with reinforcement member were attempted in a single mold in the making of the preform initially. The resultant molded part will be anisotropic in nature, thereby stronger and lighter.

The invention has been described by reference to schematic illustrative embodiments thereof and changes and modifications may become apparent to those skilled in the art without departing from the spirit and scope of the invention. The energetic stitching arrangement has been shown schematically and described somewhat in process steps, but it will be understood that both the process and apparatus are intended to be covered.

We claim:

1. A method of making complex preforms by energetic stitching comprising the steps:

positioning a preform having a preform attachment surface;

positioning a member having a member surface to be placed in surface contact with the preform attachment surface;

applying electromagnetic energy curable binder between said surfaces;

bringing said surfaces together in surface contact; and applying electromagnetic energy to said binder in a manner such that the preform and member will be attached over an area less than the full surfaces where they are in contact.

2. A method of making complex preforms by energetic stitching in accordance with the steps of claim 1:

wherein the binder applied is an ultraviolet energy curable binder and an ultraviolet energy is applied from a source in a manner such that the preform and member will be attached over an area less than the full surfaces where they are in contact.

3. A method of making complex preforms by energetic stitching in accordance with the steps of claim 2:

wherein the binder is applied over only a limited area between the surfaces of the preform and the member.

4. A method of making complex preforms by energetic stitching in accordance with the steps of claim 2:

wherein the binder is applied over a limited area and the ultraviolet energy is applied over an area broader than the area to which the binder is limited.

5. A method of making complex preforms by energetic stitching in accordance with the steps of claim 2:

wherein the binder is applied to a limited area less than the surface contact between the preform and the member and ultraviolet energy is applied solely to the areas of the binder.

6. A method of making complex preforms by energetic stitching in accordance with the steps of claim 2:

wherein the binder is applied to a substantial area between the surfaces of the preform and the member and a mask is located between the source of ultraviolet energy and the binder so that the binder is cured only in areas exposed by openings in the mask leaving uncured binder for attachments.

7. A method of making complex preforms by energetic stitching in accordance with the steps of claim 2:

wherein the binder is applied and a mask is provided so that the binder contacts an area between said surfaces for only a limited area.

8. An apparatus for making complex preforms utilizing energetic stitching comprising:

means positioning a preform having a preform attachment surface;

means positioning a member having a member surface to be placed in surface contact with the preform surface;

means applying electromagnetic energy curable binder between said surfaces;

means bringing said surfaces together in surface contact;

and means applying electromagnetic energy to said binder in a manner such that the preform and member will be attached over an area less than the full surfaces where they are in contact.

9. An apparatus for making complex preforms by electromagnetic stitching in accordance with claim 8:

wherein said applying means applies a binder curable by ultraviolet energy, and said applying means applies an ultraviolet curing energy to the binder.

10. An apparatus for making complex preforms by electromagnetic stitching in accordance with claim 9:

wherein said binder applying means applies binder over only a limited area between the surfaces.

11. An apparatus for making complex preforms by electromagnetic stitching in accordance with claim 9:

wherein said energy applying means applies ultraviolet energy over an area greater than the area covered by the binder.

12. An apparatus for making complex preforms by electromagnetic stitching in accordance with claim 9:

wherein said binder applying means applies binder over only a limited area between said surfaces and said energy applying means applies energy only to the area covered by said binder.

13. An apparatus for making complex preforms by electromagnetic stitching in accordance with claim 9:

including a mask positioned between said energy applying means and said binder so that the binder hardens only in areas of mask openings.

14. An apparatus for making complex preforms by electromagnetic stitching in accordance with claim 9:

including a mask with openings positioned between the surface and the binder applying means so that the binder is applied over only a limited area.

15. The method of making complex preforms by energetic stitching comprising the steps:

supplying a first preform having an attachment surface;

supplying a second preform having an attachment surface to be applied to the first attachment surface;

applying electromagnetic energy curable binder between said surfaces;

and applying electromagnetic energy to said binder to join said first and second preforms providing a complex joined preform.

16. A method of making complex preforms by energetic stitching in accordance with claim 15:

wherein the binder is cured over a limited area between said surfaces.

17. A method of making complex preforms by energetic stitching in accordance with claim 15:

wherein said binder is applied over only a limited area between the surfaces.

18. A method of making complex preforms by energetic stitching comprising the steps:

supplying a first preform;

supplying a second preform to the first preform for enlarging the first preform;

positioning said first and second preforms together in surface contact;

applying an electromagnetic energy curable binder between said surfaces;

and curing said binder in limited areas to join and enlarge the resultant preform.

19. A method of making complex preforms by energetic stitching comprising the steps:

supplying a first preform;

supplying a plurality of additional preforms in touching contact with at least one of said additional preforms engaging said first preform;

locating an electromagnetic energy curable binder at locations of touching contact;

and curing the binder between said preforms to provide a new larger complex preform.

* * * * *